United States Patent
Kinoshita

(10) Patent No.: US 8,420,701 B2
(45) Date of Patent: Apr. 16, 2013

(54) POLYMER ELECTROLYTE MEMBRANE, MEMBRANE-ELECTRODE ASSEMBLY FOR POLYMER ELECTROLYTE FUEL CELLS AND PROCESS FOR PRODUCING POLYMER ELECTROLYTE MEMBRANE

(75) Inventor: Shinji Kinoshita, Yokohama (JP)

(73) Assignee: Asahi Glass Company, Tokyo (JP)

( * ) Notice: Subject to any disclaimer, the term of this patent is extended or adjusted under 35 U.S.C. 154(b) by 2392 days.

(21) Appl. No.: 11/249,711

(22) Filed: Oct. 14, 2005

(65) Prior Publication Data

US 2006/0068258 A1  Mar. 30, 2006

Related U.S. Application Data

(63) Continuation of application No. PCT/JP2004/005351, filed on Apr. 15, 2004.

(30) Foreign Application Priority Data

Apr. 17, 2003 (JP) ................................. 2003-112714

(51) Int. Cl.
*C08J 5/20* (2006.01)
*H01M 8/10* (2006.01)

(52) U.S. Cl.
USPC ............... 521/27; 521/25; 429/493; 429/491; 429/479

(58) Field of Classification Search ............. 429/34, 429/30, 38, 493, 491, 479; 521/27, 25
See application file for complete search history.

(56) References Cited

U.S. PATENT DOCUMENTS

| | | | | |
|---|---|---|---|---|
| 5,639,573 A | * | 6/1997 | Oliver et al. | 429/303 |
| 6,130,175 A | * | 10/2000 | Rusch et al. | 442/77 |
| 6,224,994 B1 | * | 5/2001 | Asukabe et al. | 429/33 |
| 6,866,952 B2 | * | 3/2005 | Corey et al. | 429/19 |
| 7,223,491 B2 | | 5/2007 | McLean et al. | |
| 7,226,646 B2 | | 6/2007 | McLean et al. | |
| 7,378,176 B2 | | 5/2008 | McLean et al. | |
| 2003/0152817 A1 | | 8/2003 | Sato et al. | |

FOREIGN PATENT DOCUMENTS

| | | |
|---|---|---|
| EP | 1 139 472 A1 | 10/2001 |
| EP | 1298752 | 4/2003 |
| EP | 1355370 | 10/2003 |
| JP | 8-259710 | 10/1996 |
| JP | 10-012212 * | 1/1998 |
| JP | 2000-215903 | 8/2000 |
| JP | 2003-100318 | 4/2003 |
| WO | WO 01/91213 | 11/2001 |
| WO | WO 02/059996 | 8/2002 |

OTHER PUBLICATIONS

U.S. Appl. No. 11/312,342, filed Dec. 21, 2005, Kotera, et al.

* cited by examiner

*Primary Examiner* — Helen O Conley
(74) *Attorney, Agent, or Firm* — Oblon, Spivak, McClelland, Maier & Neustadt, L.L.P.

(57) ABSTRACT

A polymer electrolyte membrane comprises at least one layer of a perforated sheet having many through-holes formed substantially parallel to the thickness direction with an average cross-sectional area per hole ranging from $1 \times 10^{-3}$ to 20 mm$^2$, wherein the numerical aperture based on the through-holes ranges from 30 to 80%, and the through-holes are filled with an ion exchange resin.

30 Claims, 5 Drawing Sheets

(A)

(B)

(A)

20    21

(B)

20    21

POLYMER ELECTROLYTE MEMBRANE, MEMBRANE-ELECTRODE ASSEMBLY FOR POLYMER ELECTROLYTE FUEL CELLS AND PROCESS FOR PRODUCING POLYMER ELECTROLYTE MEMBRANE

TECHNICAL FIELD

The present invention relates to a separation membrane for various electrochemical apparatus, particularly, an ion exchange membrane to be used as an electrolyte membrane for polymer electrolyte fuel cells, and a membrane-electrode assembly for polymer electrolyte fuel cells, using the ion exchange membrane.

BACKGROUND ART

Heretofore, it has been common to employ separation membranes made of various ion exchange membranes in various fields. Also in polymer electrolyte fuel cells which have been actively developed recently, an ion exchange membrane as one of separation membranes is used as a polymer electrolyte membrane. The polymer electrolyte fuel cells are expected to be widely used for movable bodies such as automobiles, or as distributed power generation systems or cogeneration systems for home use, since their power density is high and their operating temperature is low, whereby downsizing is possible.

For polymer electrolyte fuel cells, a polymer electrolyte membrane having a thickness of from about 20 to 120 μm is usually used, and a cation exchange membrane made of a perfluorocarbon polymer having chemically stable sulfonic acid groups is used in many cases. When power generation is carried out, catalyst layers containing metal catalysts are bonded on both sides of the electrolyte membrane to prepare a membrane-catalyst layer assembly, and then gas diffusion layers made of e.g. carbon cloths or carbon papers are disposed on both outside surfaces to prepare a membrane-electrode assembly. Further, on both outside surfaces of the gas diffusion layers, electroconductive separators having gas channels formed are disposed respectively to form a minimum unit for power generation called a single cell. However, the voltage generated in the single cell at usual power generation is at most 1 V. Therefore, in order to obtain a practical voltage, a plurality of such single cells are laminated and used as a stack.

The above catalyst layers are formed by applying a dispersion having, as main solid components, carbon having a metal catalyst supported thereon and a polymer electrolyte resin (ion exchange resin) dispersed in a dispersion medium, directly on a polymer electrolyte membrane, or applying the dispersion on a separately prepared substrate and subsequently transferring it on a polymer electrolyte membrane by e.g. hot pressing.

However, the polymer electrolyte membrane undergoes a dimensional change depending upon the water content. In addition, such a polymer electrolyte membrane is insufficient in mechanical strength. Therefore, when a membrane-electrode assembly is to be produced, positioning tends to be difficult in the production process, wrinkles tend to be formed in its production, or the polymer electrolyte membrane is likely to be torn. Further, even when the membrane-electrode assembly produced is free from e.g. wrinkles, it has a difficulty in handling during assembling a cell or stacking, or the polymer electrolyte membrane is likely to be torn during cell operation, and thus, reliability of the cell is not necessarily sufficient. Accordingly, it is desired that a membrane-electrode assembly has sufficient mechanical strength, chemical stability and dimensional stability.

As a method to solve the above-mentioned problems, it was proposed to use a membrane which is a polytetrafluoroethylene (hereinafter referred to as PTFE) porous membrane impregnated with a fluorinated ion exchange polymer having sulfonic acid groups (JP-B-5-75835). Further, a cation exchange membrane reinforced with a fibrillated, woven or non-woven perfluorocarbon polymer was also proposed (JP-B-6-231779). However, neither of them had a sufficient effect to suppress a stress which causes the ion exchange membrane to stretch when hydrated. Accordingly, a substantial dimensional change occurred, and the mechanical strength was insufficient.

Further, a method of introducing an electrolyte into a membrane substrate having perpendicular communicating pores with a diameter of approximately 8 μm (U.S. Pat. No. 4,673,624) or a method of introducing ion exchange groups into a membrane substrate having communicating pores with an area of from 0.2 to 30,000 $nm^2$ which are perpendicular to the thickness direction (JP-A-2002-203576). However, such a membrane substrate has a restriction such that its variety is limited, and therefore there is such a problem that a chemically stable substrate can not necessarily be selected. Further, in a case where the pore diameter is small, there is a problem in production efficiency because it takes time and costs to form pores on a membrane substrate having a large-area as a practical size so as to secure a sufficient numerical aperture.

Further, it has been proposed to improve the handling efficiency at the time of assembling a cell or stacking, and further improve the strength in the peripheral portion of a membrane by providing a frame-like reinforcing film having its center cut away on the principal peripheral portion of a membrane-electrode assembly at which ion conductivity is not required (JP-B-3052536). However, there is a problem in productivity at bulk-production such that even when the frame-like film is provided on the peripheral portion, wrinkles are likely to be formed due to poor adhesion to the ion exchange membrane.

DISCLOSURE OF THE INVENTION

Accordingly, it is an object of the present invention to solve the above problems of the prior art, and to provide a polymer electrolyte membrane excellent in mechanical strength, chemical stability and dimensional stability and a membrane-electrode assembly for polymer electrolyte fuel cells having such a polymer electrolyte membrane.

The present invention provides a polymer electrolyte membrane characterized by comprising at least one layer of a perforated sheet having many through-holes formed substantially in parallel to the thickness direction with an average area per hole of from $1\times10^{-3}$ to 20 $mm^2$, wherein the numerical aperture based on the through-holes is from 30 to 80%, and an ion exchange resin is filled in the through-holes.

The polymer electrolyte membrane having such a constitution is reinforced by the perforated sheet. This perforated sheet has a numerical aperture of from 30 to 80% by the many through-holes, and the respective through-holes are filled with an ion exchange resin. The polymer electrolyte membrane may be composed solely of the perforated sheet having the respective through-holes filled with an ion exchange resin (hereinafter referred to as the filled layer). However, it is preferred that a layer made solely of an ion exchange resin (hereinafter referred to as a resin layer) is formed on at least one side thereof to constitute an electrolyte membrane, whereby the electroconductivity will be increased. Here, the ion exchange resin filled in the through-holes may be the same or different from the ion exchange resin of the resin layer. However, the resin layer is not reinforced by the perforated sheet. Therefore, as the ion exchange resin constituting the resin layer, it may be effective to use a different resin, such as a resin having a strength higher than that of the ion exchange resin filled in the through-holes, such as a resin having a low ion exchange capacity.

Further, the filled layer is reinforced by the perforated sheet, and therefore, the strength of the ion exchange resin itself may not be so high. Accordingly, an ion exchange resin having a high ion exchange capacity and not having high strength may be used to increase the electroconductivity of the obtainable membrane.

Further, two or more filled layers may be present in the polymer electrolyte membrane in a laminated state. In such a case, two or more filled layers may be the same or different, and may be laminated adjacent to one another or may be laminated via a layer made of an ion exchange resin.

Further, the present invention provides a polymer electrolyte membrane characterized by comprising at least one layer of a perforated sheet comprising a region 1 wherein many through-holes are formed substantially in parallel to the thickness direction with an average area per hole of from $1 \times 10^{-3}$ to 20 mm$^2$, and the numerical aperture based on the through-holes is from 30 to 80%, and a region 2 which is a peripheral portion of the above region 1 and which has a lower numerical aperture than the above region 1 or has no through-holes, and wherein an ion exchange resin is filled in the through-holes.

In such a case, the region 2 which is a peripheral portion of the membrane, reinforced by the region 1 having a high numerical aperture, is further reinforced, whereby the handling efficiency as a membrane will be improved, and the dimensional stability will also be increased.

Further, the present invention provides a membrane-electrode assembly for polymer electrolyte fuel cells, which comprises a catalyst layer containing a catalyst disposed on each side of the above polymer electrolyte membrane.

BEST MODE FOR CARRYING OUT THE INVENTION

Figure 2:
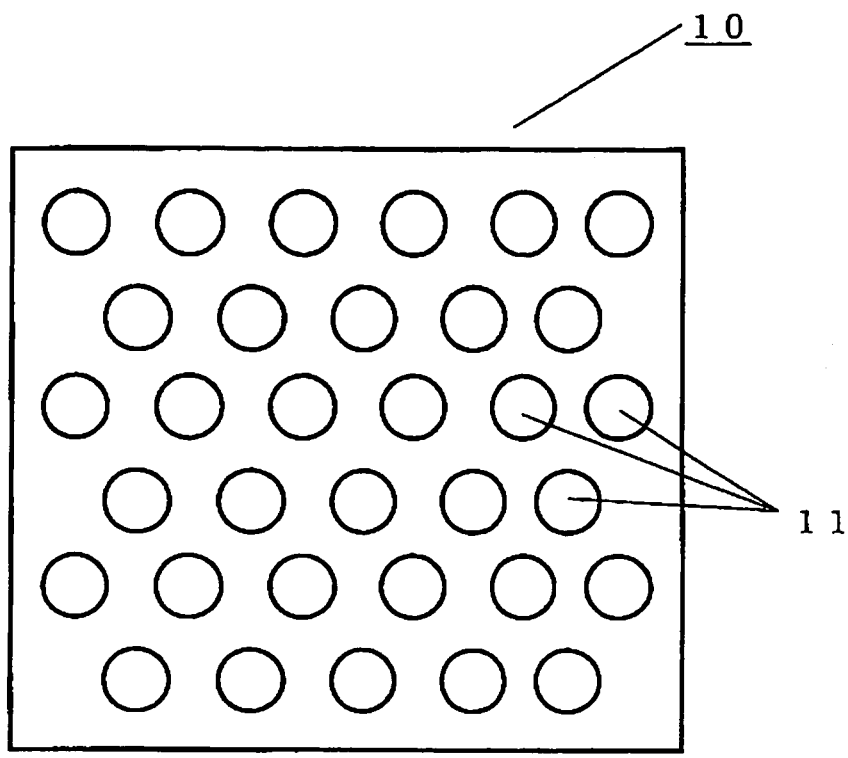
FIG. 2 is a view illustrating the first embodiment of the perforated sheet in the present invention.
Figure 3:
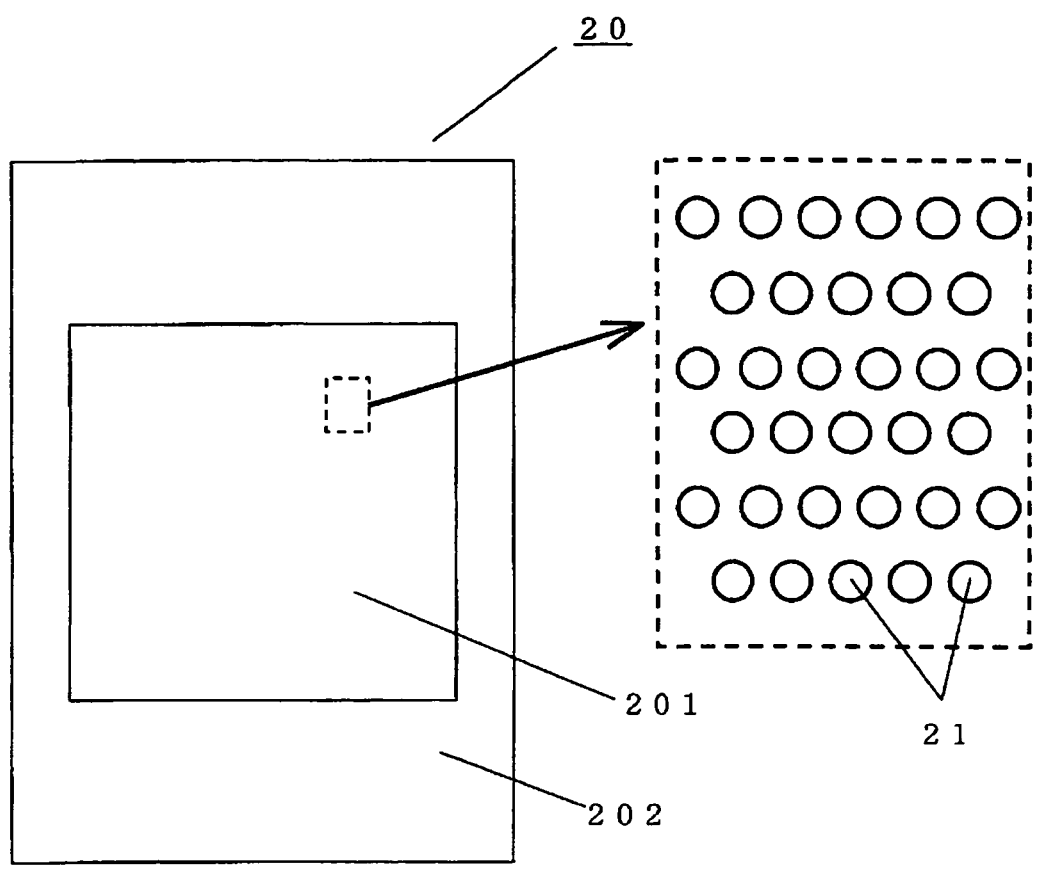
FIG. 3 is a view illustrating the second embodiment of the perforated sheet in the present invention.

The perforated sheet in the present invention has many through-holes formed substantially in parallel to the thickness direction, wherein the region having the many through-holes has a numerical aperture of from 30 to 80%. As shown in FIG. 2, in the first embodiment of the perforated sheet in the present invention, many through-holes 11 are formed on the entire area of a perforated sheet 10. Further, as shown in FIG. 3, the second embodiment of the perforated sheet in the present invention comprises a region 1 (201) having many through-holes 21 formed therein and a region 2 (202) having no through-holes or having a numerical aperture lower than that of the region 1 (201). Namely, the second embodiment of the perforated sheet has a structure wherein through-holes are eliminated or reduced only at the peripheral portion of the perforated sheet 10 of the first embodiment. Such a structure is useful in a case where the region 2 is not required to have a function as an electrolyte, and one having the perforated sheet of the second embodiment can have the strength of the polymer electrolyte membrane more increased.

As a method for obtaining such perforated sheets 10 and 20, a method of forming many through-holes in the sheets, may be employed. Specifically, a method of mechanically punching an imperforated sheet as a substrate, or a method of forming pores in an imperforated sheet by using a laser beam, may, for example, be mentioned. In the mechanically punching method, a punching block which can form from a few hundreds to a few ten thousands pores at once may be used. In such a case, many through-holes can be formed in a short period of time by laminating a few tens, a few hundreds or a few thousands sheets. Further, drilling is also suitable, and it is possible to form many through-holes in a short period of time by using a multi-spindle NC drilling machine and by laminating a few tens, a few hundreds or a few thousands sheets, whereby the production efficiency can be increased.

In the present invention, the average area per through-hole is approximately from $1 \times 10^{-3}$ to 20 mm$^2$, particularly preferably approximately from $4 \times 10^{-3}$ to 4 mm$^2$. If the size of each through-hole is too small, the number of pores per unit area becomes very large, whereby the productivity tends to decrease, or filling of an ion exchange resin tends to be difficult. On the other hand, if the size of each through-hole is too large, the entire area of the electrolyte membrane thereby obtained can not be uniformly reinforced, and as a result, the strength of the membrane is likely to be insufficient. If the area of the through-hole is within the above range, the membrane has practically uniform and sufficient strength, can be produced in good productivity, and further has sufficient ion conductivity.

The size or shape of through-holes of the perforated sheet may be uniform, but two or more sizes or shapes may be present as mixed. The shape of the through-hole is not particularly limited, but is preferably a circular form or a corner-removed form. If the through-hole has a corner, such a corner becomes a notch, whereby the strength as a reinforcing member tends to decrease.

The numerical aperture of the portion having through-holes in the perforated sheet, based on the through-holes, is from 30 to 80% as mentioned the above, and is particularly preferably from 50 to 75%. If such numerical aperture is too low, the ion conductivity tends to be poor. On the other hand, if the numerical aperture is too high, an electrolyte membrane obtainable can not be sufficiently reinforced, and the strength of the membrane tends to be insufficient. Further, the thickness of the perforated sheet 10 or 20 is from 3 to 50 μm, particularly preferably from 5 to 30 μm. If the thickness of the perforated sheet 10 or 20 is too thin, a polymer electrolyte membrane obtainable tends not to be sufficiently reinforced. On the other hand, if it is too thick, the thickness of an electrolyte membrane obtainable becomes too thick, the resistance against ion conductivity becomes high, the resistance loss becomes large, and thus no sufficient performance may be obtained.

The perforated sheet 10 or 20 in the present invention is not particularly limited, but its thickness is preferably uniform because the membrane obtainable can be uniformly reinforced. Further, from the viewpoint of operation efficiency to form through-holes, it is preferred to employ a material which can easily be punched or drilled, or can be perforated by laser processing.

The above perforated sheet 10 or 20 is not particularly limited so long as it is in the form of a film, but it is preferably one made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene, as also having chemical stability. In a case where it is desired to increase mechanical strength rather than the chemical stability, a metallic foil of e.g. stainless steel or titanium may be used. In the present invention, a plurality of perforated sheets may be laminated and incorporated in the electrolyte membrane. In such a case, perforated sheets made of different polymers may be laminated.

Figure 1:
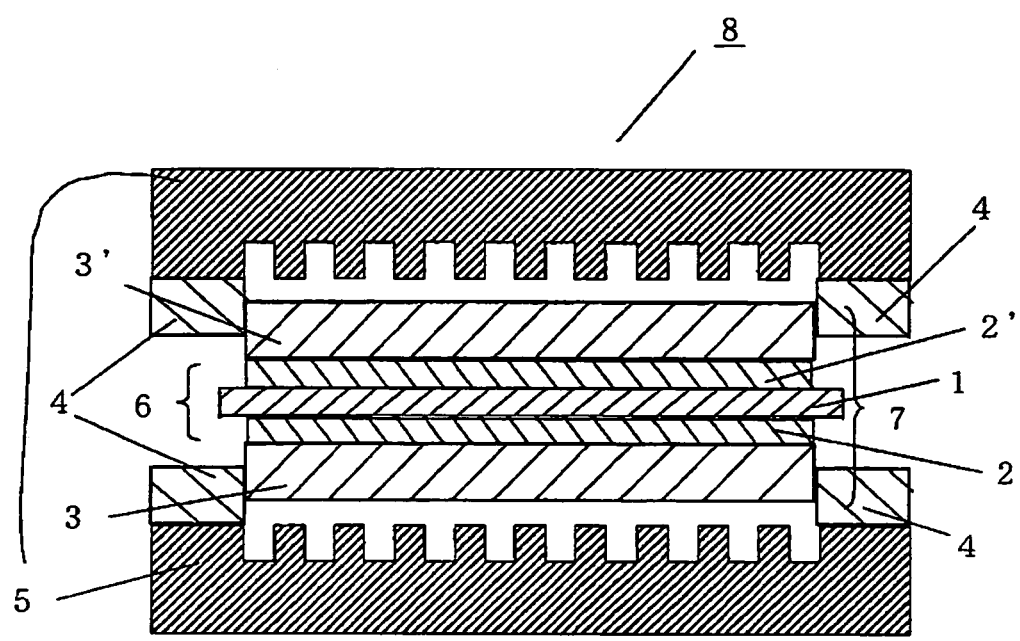
FIG. 1 is a cross-sectional view illustrating a single cell of a polymer electrolyte fuel cell having a membrane-electrode assembly as an embodiment of the present invention.

Now, the membrane-electrode assembly for polymer electrolyte fuel cells of the present invention will be described. FIG. 1 is a cross-sectional view illustrating a single cell 8 of a polymer electrolyte fuel cell having a membrane-electrode assembly as an embodiment of the present invention. A membrane-catalyst layer assembly 6 is formed by a polymer electrolyte membrane 1 reinforced by a perforated sheet, and catalyst layers 2 and 2' disposed on both sides of the polymer electrolyte membrane 1 and bonded thereto. A membrane-electrode assembly 7 of the present invention may be made solely of the membrane-catalyst layer assembly 6, but is preferably one having gas diffusion layers 3 and 3' further disposed outside the membrane-catalyst layer assembly 6.

The gas diffusion layer 3 or 3' is usually made of an electroconductive porous material such as carbon cloth or carbon paper, and has a function as a current collector and a function of diffusing gas so as to supply gas substantially uniformly to the membrane-catalyst layer assembly 6. Further, the catalyst layer 2 or 2' usually contains a catalyst having platinum or a platinum-alloy supported on carbon, and preferably further contains an ion exchange resin. Here, the ion exchange resin may be the same or different from the ion exchange resin constituting the polymer electrolyte membrane 1.

On the outer surface of the membrane-electrode assembly 7, separators 5 having grooves formed as gas channels are disposed, the gas is introduced to the separators 5, and this gas is supplied to the membrane-electrode assembly 7. Then, gaskets 4 are disposed on the surface of the separators 5 so as to seal the membrane-electrode assembly 7, for example, as shown in FIG. 1, to form the single cell 8. The single cell 8 is the minimum unit for power generation, and in order for a polymer electrolyte fuel cell to obtain a practical voltage, a stack having a plurality of such single cells 8 laminated is prepared and used.

In such a constitution, the in-plane peripheral portions of the membrane-electrode assembly 7 have sites to be in contact with gaskets 4 which seal gas when the membrane-electrode assembly 7 is supported by separators. Such portions are not sites where an electrode reaction is carried out, and may not have an ion conductivity. Accordingly, in such a case, it is preferred to use an electrolyte membrane with a layer having the perforated sheet 20 of the second embodiment filled with the ion exchange resin. Namely, in such a case, if it is constructed so that the electrode reaction is carried out in the region 1 (201) and the gaskets 4 are in contact with the region 2, the mechanical strength and dimensional stability can be further increased, assembling of a cell or stacking becomes easy, and a fuel cell having high reliability and high performance can be provided.

The method of filling the ion exchange resin in the perforated sheet is not particularly limited, and may, for example, be a method wherein a liquid having the ion exchange resin dispersed (dissolved) in a dispersion medium (solvent) (hereinafter referred to as an ion exchange resin-containing coating liquid) is applied on one side or both sides of the perforated sheet, or a method wherein the perforated sheet is impregnated with the ion exchange resin-containing coating liquid, followed by drying. Further, an ion exchange resin film may preliminarily be formed, and the ion exchange resin film may be laminated with the perforated sheet, followed by thermal pressing to inject the ion exchange resin into through-holes.

The polymer electrolyte membrane of the present invention may be made solely of a filled layer of the perforated sheet having through-holes filled with an ion exchange resin, but it is preferred that the resin layer is formed on at least one side of the filled layer. If the polymer electrolyte membrane is made solely of the filled layer, the aperture of the perforated sheet exposed on the surface of the membrane is in contact with the electrodes when the membrane-electrode assembly is formed, whereby the contact area of the electrode and the ion exchange resin will be small. Accordingly, the ion conductivity between the electrode and the electrolyte membrane tends to be low.

The resin layer may be formed by coating during filling the ion exchange resin in the perforated sheet, or the resin layer may be prepared separately on a substrate and then bonded to the filled layer by e.g. hot pressing. Further, the sheet may have both a resin layer which is formed by coating for filling the through-holes and a resin layer prepared separately. Further, the resin layer may be formed by applying the ion exchange resin-containing liquid on the perforated sheet having the ion exchange resin filled. The ion exchange resin to form the resin layer may be the same or different from the ion exchange resin filled in the perforated sheet. Further, these methods may be repeated or carried out in combination.

Figure 4:
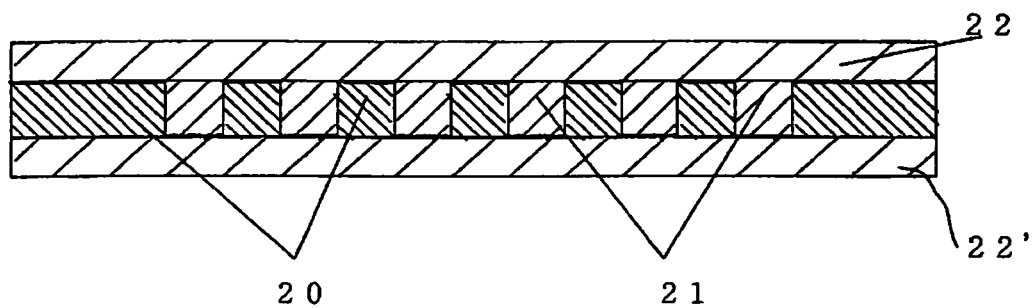
FIG. 4 are cross-sectional views illustrating a polymer electrolyte membrane using the perforated sheet of the second embodiment.
Figure 4:
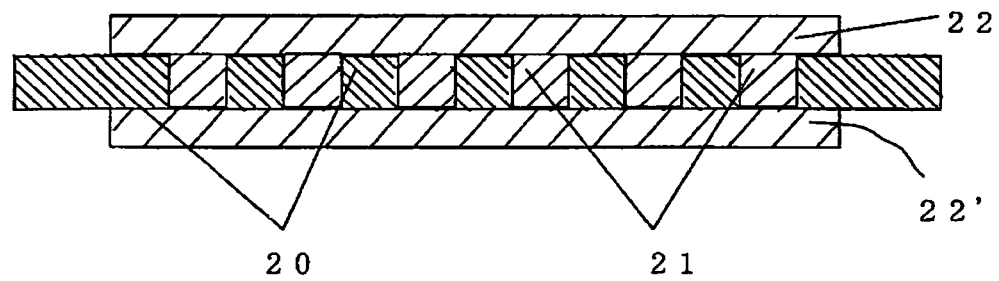

In a case where as a perforated sheet the perforated sheet 20 is used and a resin layer is formed on its surface, two methods shown in FIG. 4 may, for example, be mentioned. FIG. 4 are cross-sectional views illustrating embodiments of the polymer electrolyte membrane using the second embodiment of the perforated sheet. In FIG. 4 (A), an ion exchange resin is filled in pores 21 of a perforated sheet 20, and resin layers 22 and 22' are formed on both sides of the perforated sheet 20. The resin layers 22 and 22' have substantially the same area as the perforated sheet 20.

On the other hand, also in FIG. 4 (B), an ion exchange resin is filled in pores 21 of a perforated sheet 20, and resin layers 22 and 22' are formed on both sides of the perforated sheet 20. However, the areas of the resin layers 22 and 22' on both sides are smaller than that of the perforated sheet 20, and are somewhat larger than that of the region 1 (201). In the region 2 (202) of the perforated sheet 20, the electrode reaction is not carried out, and therefore, the resin layers 22 and 22' are not required to be laminated. In a case where the cost is taken into consideration, the embodiment of FIG. 4 (B) is preferred to the embodiment of FIG. 4 (A) in that the amount of the ion exchange resin to be used can be reduced.

Further, in the present invention, in order to further increase the strength of the polymer electrolyte membrane, a reinforcing filler in a short fiber form may be dispersed and contained in the filled layer made of the ion exchange resin in the perforated sheet. Particularly, if the reinforcing filler in a short fiber form having an average fiber diameter of from 0.01 to 20 μm, an average fiber length of from 1 to 10 mm and an aspect ratio of at least 5, is dispersed in the filled layer, more tiny sites inside the pores may also be reinforced, whereby the strength of the entire membrane will be increased. Accordingly, a cell having such a membrane will have its durability further improved at the time of operation. Such a reinforcing filler may preliminarily be dispersed and incorporated in the above ion exchange resin-containing coating liquid, so that by the application of the liquid, the reinforcing filler can easily be incorporated to the filled layer.

As the reinforcing filler, short fibers made of e.g. a fibrillated fluorocarbon polymer or polypropylene may, for example, be mentioned. As the fibrillated fluorocarbon polymer, a copolymer containing at least 95 mol % of polymerized units based on PTFE and tetrafluoroethylene may particularly be mentioned. The fibrillated PTFE may be obtained by applying a shearing force to a powder of PTFE. Particularly, a method of incorporating the fibril of PTFE in the ion exchange resin-containing liquid, the following method may, for example, be mentioned.

For example, as a resin which becomes an ion exchange resin by post-treatment, a fluoropolymer having —$SO_2F$ groups and a powder of PTFE are mixed, and the mixture is molded by twin screw extrusion to obtain pellets. In order to further fibrillate PTFE, such pellets may be extruded in a form of a film. Then, the pellets or film obtained is hydrolyzed and converted to an acid form, the —$SO_2F$ groups are converted to sulfonic acid groups (—$SO_3H$ groups), and the product is dispersed in a dispersion medium to obtain a dispersion. Here, during kneading the mixture by a twin screw extruder to obtain the pellets (and extrusion to form a film), a shearing force is applied to PTFE to have it fibrillated.

Such a reinforcing filler may be contained only in the filled layer of the perforated sheet. However, in a case where a resin layer is formed on at least one side of the perforated sheet, the reinforcing filler may be contained in the resin layer. In any event, it is preferred that the outermost surface layer of the ion exchange membrane is made solely of an ion exchange resin not containing a reinforcing filler of a short fiber form, because the surface can be made flatter and the gas separation properties can be improved.

The thickness of the polymer electrolyte membrane in the present invention is preferably from 15 to 100 μm, particularly preferably from 30 to 50 μm, in the case of using for a hydrogen-oxygen type polymer electrolyte fuel cell. Further, in the case of a direct methanol type fuel cell, it is preferably from 100 to 250 μm, since it is required to suppress permeation of methanol through the membrane. If thickness of the electrolyte membrane is thick, it is effective to incorporate a plurality of perforated sheets with a view to reinforcement of the membrane.

The ion exchange resin in the present invention is preferably a cation exchange resin made of a perfluorocarbon polymer (which may contain an oxygen atom of an ether bond type) having sulfonic acid groups. As the cation exchange resin, a cation exchange resin made of a hydrocarbon polymer or a partially fluorinated hydrocarbon polymer may also, for example, be used. Further, the ion exchange resins may be used alone or in combination as a mixture of two or more ion exchange resins.

In the polymer electrolyte fuel cell obtained as described above, hydrogen gas is supplied to the anode, and oxygen or air is supplied to the cathode. At the anode, a reaction represented by $H_2 \rightarrow 2H^+ + 2e^-$ proceeds, and at the cathode, the reaction represented by $\frac{1}{2}O_2 + 2H^+ + 2e^- \rightarrow H_2O$ proceeds, to convert chemical energy into electric energy. Further, in addition, the membrane-electrode assembly of the present invention may preferably be used also for the direct methanol type fuel cell in which methanol is supplied to the anode.

Now, the present invention will be described in further detail with reference to Examples and Comparative Example. However, it should be understood that the present invention is by no means restricted thereto.

EXAMPLE 1

Present Invention

Preparation of Membrane

To a film made of a perfluoroalkoxyethylene polymer (trade name: TOYOFLON PFA, manufactured by Toray Industries, Inc.) with a thickness of 25 μm, about 34,800 through-holes having a diameter of 500 μm (average area per through-hole: about 0.196 mm$^2$) are formed in about a 100 mm square at the center portion in a staggered arrangement so as to have a center distance of 580 μm by a punching machine, to prepare a perforated sheet 1 of a 120 mm square. The numerical aperture of this perforated sheet 1 is 68%.

This perforated sheet 1 is provided on a polyethylene terephthalate substrate having a thickness of approximately 100 μm and having the surface treated with a silicone releasing agent (the same substrate as this will be referred to PET substrate in the following Examples), and a dispersion of an ion exchange resin comprising repeating units based on $CF_2$=$CF_2$ and repeating units based on $CF_2$=CF—$OCF_2CF$($CF_3$)—$OCF_2CF_2SO_3H$ (ion exchange capacity: 1.1 meq/g dry resin, trade name: Flemion, manufactured by Asahi Glass Company, Limited, hereinafter referred to as dispersion a) was applied thereon by die coating so as to have a total thickness of 35 μm, and dried at 80° C. to obtain a membrane A.

Here, the membrane A consists of a 25-μm thick filled layer having an ion exchange resin filled in apertures of the perforated sheet 1 and a 10-μm thick resin layer which is formed on its surface, and which is not reinforced.

Then, the PET substrate is peeled from the membrane A, the front side and back side of the membrane A are reversed, and this time, the membrane A is placed on a separately prepared PET substrate again so that the surface which was not in contact with the previous substrate is in contact with the substrate. The dispersion a is applied thereon by die coating so that the total thickness would be 45 μm, and dried at 80° C. Further, heat treatment is carried out at 120° C. for 30 minutes, and then the PET substrate is peeled to obtain a membrane B. The membrane B consists of three layers having 10-μm thick resin layers, which are not reinforced, laminated on both sides of a 25-μm thick filled layer. With regard to the membrane B thus obtained, the elastic modulus in tension and the dimensional change are measured by the following methods. The results of the respective measurements are shown in Table 1. Further, by using the membrane B, a fuel cell was prepared and evaluated as follows. The results are shown in Table 2.

Measurement of Elastic Modulus in Tension

The membrane to be measured is made to be a strip sample with a width of 5 mm and a total length of 75 mm, and the sample was subjected to a tensile test with a distance between benchmarks of 25 mm with a distance between chucks of 50 mm at a test rate of 50 mm/min. The slope of the initial 10% distortion in a chart of the obtained displacement under the load is determined, and the elastic modulus in tension is determined from the slope.

Measurement of Dimensional Change

The membrane to be measured is left to stand for 24 hours at a temperature of 25° C. under a relative humidity of 50%, and its center portion was cut into a 50 mm square and then immersed in hot water of 90° C. for 16 hours. Then, the dimensions of the respective sides of this membrane (side 1 and side 2 which are respectively right-angled) are measured, and the dimensional change against the dimensions before the membrane is immersed in the hot water, is calculated. Further, it is optionally decided which side of the membrane sample, should be the side 1.

Preparation and Evaluation of Fuel Cell

First, a catalyst layer is prepared as follows. Namely, the dispersion a and a supported catalyst having a 55 mass % of platinum supported on carbon are dispersed in a dispersion medium having ethanol and water mixed (at a mass ratio of 1:1) to obtain a catalyst dispersion having a solid content concentration of 14 mass %. This catalyst dispersion is applied by die coating, on a PET film having a thickness of 100 μm and having the surface treated with a silicone releasing agent, followed by drying at 80° C. to form a catalyst layer having a thickness of 10 μm and an amount of platinum supported of about 0.4 mg/cm$^2$.

Then, the above catalyst layers cut into a 5 cm square are respectively provided on both sides of the above membrane (membrane B in the case of Example 1), and the catalyst layers are transferred onto the membrane by a transfer method to prepare a membrane-catalyst layer assembly. At that time, the transferring is carried out at a temperature of 130° C. under a pressure of 3 MPa, the membrane-catalyst layer assembly is prepared so that the catalyst layer having an area of 25 cm$^2$ is provided on its center, and its external shape is a rectangle of 110 mm×90 mm.

Then, two sheets of carbon cloth having a thickness of about 300 μm and having a conductive layer with a thickness of about 10 μm composed of carbon black and polyetrafluoroethylene particles formed on the surface, are prepared as gas diffusion layers, and provided on both sides of the membrane-catalyst layer assembly to obtain a membrane-electrode assembly with gas diffusion layers.

This membrane-electrode assembly is sandwiched, with gaskets around it, between a pair of separators having flow paths for supply of reaction gases to prepare a fuel cell having an effective electrode area of 25 cm$^2$ for measurement of cell performance. At a cell temperature of 70° C., hydrogen gas is supplied to the anode of this cell, and air is supplied to the cathode. Here, the gases are supplied at a utilization rate of hydrogen gas of 70% and a utilization rate of air of 40%, and each gas is humidified through a bubbler having a temperature of 70° C. and supplied to the cell. Table 2 shows the relation between the current density and the cell voltage, and the result of the internal resistance measured by a 1 kHz alternating-current miliohmmeter.

EXAMPLE 2

Present Invention 9,730 g of a copolymer powder (ion exchange capacity: 1.1 meq/g dry resin) composed of repeating units based on tetrafluoroethylene and repeating units based on $CF_2=CF-OCF_2CF(CF_3)O(CF_2)_2SO_2F$ and 270 g of a PTFE powder (trade name: Fluon CD-1, manufactured by Asahi Glass Company, Limited) are mixed and subjected to twin screw extrusion to obtain 9,500 g of pellets. At least one portion of the PTFE powder is fibrillated by this extrusion. The pellets are hydrolyzed in an aqueous solution containing 30% of dimethyl sulfoxide and 15% of potassium hydroxide based on the total mass of the solution, and then immersed in 1 mol/L hydrochloric acid at room temperature for 16 hours to convert the above copolymer powder into an acid form (sulfonic acid groups), followed by washing with water and drying. This product is dispersed in ethanol to obtain a dispersion b having a solid content concentration of 10% (mass ratio).

In the same manner as in Example 1 except that the dispersion b is used instead of the dispersion a, the dispersion b is applied on the perforated sheet 1 and dried to obtain a membrane C having the filled layer reinforced by the perforated sheet 1 and having a fibril of PTFE dispersed in the membrane. With regard to this membrane C, the elastic modulus in tension and the dimensional change are measured in the same manner as in Example 1, to obtain the result as shown in Table 1. Further, by using the membrane C, a membrane-electrode assembly is prepared and evaluated in the same manner as in Example 1, to obtain the result as shown in Table 2.

EXAMPLE 3

Present Invention

To a polyphenylene sulfide film (trade name: TORELINA 3030-12, manufactured by Toray Industries, Inc.) having a thickness of 12 μm, about 34,800 through-holes having a diameter of 500 μm (average area per through-hole: about 0.196 mm$^2$) are formed in a staggered arrangement so as to have a center distance of 580 μm by a punching machine, to prepare a perforated sheet 2 having an external shape of a 120 mm square. The numerical aperture of this perforated sheet 2 is 68%.

Figure 5:
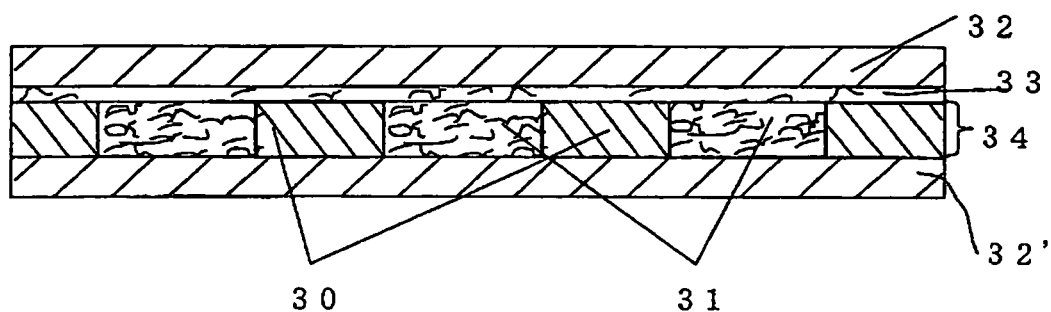
FIG. 5 is a cross-sectional view illustrating a membrane D obtainable in Example 3.

The perforated sheet 2 is provided on a PET substrate, and the dispersion b is applied thereon by die coating so as to have a total thickness of 15 μm, followed by drying at 80° C. Then, the dispersion a is applied thereon by die coating so as to have a total thickness of 21 μm, followed by drying at 80° C. The membrane thus obtained is peeled from the above substrate, the front side and the back side of the membrane are reversed, and the membrane is placed on the optionally prepared PET substrate again. Then the dispersion a is applied thereon by die coating in the same manner as in Example 1 so as to have a total thickness of 30 μm, followed by drying at 80° C. Then, this membrane is subjected to a heat treatment at a temperature of 120° C. for 30 minutes to obtain a membrane D. The cross-sectional view of the membrane D is shown in FIG. 5.

With regard to the membrane D, the dispersion b is applied on a perforated sheet 2 (30), whereby pores of the perforated sheet 2 (30) are filled with the dispersion b. A filled layer 35 is composed of a filled portion 33 and the perforated sheet 2 (30). Further, the dispersion b is applied on the perforated sheet 2 so as to have a thickness thicker than that of the perforated sheet 2 (30), whereby a PTFE fibril-containing layer 34 made of the dispersion b is formed. The layer formed on such a layer by the dispersion a is a resin layer 32 which is not reinforced. Further, the layer formed by the dispersion a after the front side and the back side are reversed is a resin layer 32' which is not reinforced.

The membrane D is composed of the resin layer 32' having a thickness of 9 μm, the filled layer 35 having a thickness of 12 μm, the PTFE fibril-containing layer 34 having a thickness of 3 μm and the resin layer 32 having a thickness of 6 μm which are laminated in this order.

With regard to this membrane D, the elastic modulus in tension and the dimensional change are measured in the same manner as in Example 1, to obtain the results as shown in Table 1. Further, by using the membrane D, a membrane-electrode assembly is prepared in the same manner as in Example 1, and the cell properties are measured in the same manner as in Example 1, to obtain the results as shown in Table 2.

EXAMPLE 4

Present Invention

To a center portion of a polyphenylene sulfide film (trade name: TORELINA 3030-12, manufactured by Toray Industries, Inc.) of a 100 mm square having a thickness of 12 µm, 46,632 through-holes having a diameter of 200 µm (an average area per through-hole: about 0.03 mm$^2$) are formed in a staggered arrangement so as to have a center distance of 250 µm by a punching machine, to prepare a perforated sheet 3. At that time, the pores are to be located at only the center portion of the above film, and the area of the perforated center portion is about 25 cm$^2$ (5 cm×5 cm). The numerical aperture at this center portion is 58%.

The perforated sheet 3 is provided on the PET substrate in a manner similar to the perforated sheet 1 in Example 1, and the dispersion a is applied thereon by die coating so as to have a total thickness of 21 µm, followed by drying at 80° C. The membrane thus obtained is peeled from the above substrate, and the front side and the back side of the membrane are reversed, and then the membrane is placed on a separately prepared PET substrate again. The dispersion a is applied thereon by die coating so as to have a total thickness of 30 µm, followed by drying at 80° C. Then, the membrane thus obtained is subjected to heat treatment at 120° C. for 30 minutes, and the PET substrate is peeled to obtain a membrane E. The membrane E is composed of a 12-µm thick filled layer having apertures of the perforated sheet 3 filled with an ion exchange resin and 9-µm resin layers, which are not reinforced, laminated on both sides of the filled layer.

With regard to the perforated center portion of this membrane E, the elastic modulus in tension and the dimensional change are measured in the same manner as in Example 1, to obtain the results as shown in Table 1. Further, by using the membrane E, a membrane-electrode assembly is prepared in the same manner as in Example 1, and the evaluation was carried out in the same manner as in Example 1, to obtain the results as shown in Table 2.

With regard to the membrane E constituting the membrane-electrode assembly, a frame-like peripheral portion is made of a polyphenylene sulfide film having no pores, whereby the tear strength from the peripheral portion is substantially improved, the dimensional stability is excellent, and the handling is also easy.

EXAMPLE 5

Comparative Example

With regard to a 30-µm thick ion exchange membrane (ion exchange capacity: 1.1 meq/g dry resin, trade name: Flemion SH-30, manufactured by Asahi Glass Company, Limited) comprising repeating units based on $CF_2=CF_2$ and repeating units based on $CF_2=CF-OCF_2CF(CF_3)-OCF_2CF_2SO_3H$, the elastic modulus in tension and the dimensional change were measured in the same manner as in Example 1. The results are shown in Table 1. Further, by using this membrane, a membrane-electrode assembly was prepared and evaluated in the same manner as in Example 1. The results are shown in Table 2.

EXAMPLE 6

Present Invention

To a polyphenylene sulfide film (trade name: TORELINA 3030-12, manufactured by Toray Industries, Inc.) of a 100 mm square having a thickness of 12 µm, about 34,800 through-holes having a diameter of 500 µm (average area per through-hole: about 0.196 mm$^2$) were formed in a staggered arrangement so as to have a center distance of 580 µm by drilling to prepare a perforated sheet 4 having an external shape of about a 120 mm square. The numerical aperture of this perforated sheet 4 is 68%.

Then, the dispersion a was applied on an about 100-µm thick tetrafluoroethylene-ethylene copolymer sheet (trade name: Fluon ETFE, manufactured by Asahi Glass Company, Limited, hereinafter referred to as an ETFE sheet) by die coating so that the total thickness would be 18 µm, followed by drying with a drying oven at a temperature of 120° C. for 30 minutes.

Two sheets of ETFE sheets coated with an ion exchange resin, thus obtained, were cut into a 120 mm square respectively, and the above perforated sheet 4 was disposed between the two ETFE sheets so as to be in contact with the ion exchange resin respectively. Then, hot pressing was carried out at a temperature of at least 140° C. and under a pressure of at least 3 MPa to integrate them. The product was gradually cooled, and the ETFE sheets on the surface were respectively peeled therefrom to obtain a 40-µm thick reinforced membrane X composed of a filled layer which was made of a 12-µm thick perforated sheet 4 having an ion exchange resin injected into the apertures and about 14-µm thick resin layers, which were not reinforced, formed on both sides of the filled layer.

With respect to this membrane X, the elastic modulus in tension and the dimensional change were measured in the same manner as in Example 1. Further, a membrane-electrode assembly was prepared in the same manner as in Example 1, and the cell properties were measured in the same manner as in Example 1. The results of the measurement are shown in Table 1 and Table 2.

TABLE 1

| | Elastic modulus in tension (MPa) | Dimensional change (%) | |
|---|---|---|---|
| | | Side 1 | Side 2 |
| Ex. 1 | 470 | 3 | 4 |
| Ex. 2 | 500 | 1 | 1.5 |
| Ex. 3 | 490 | 1 | 2 |
| Ex. 4 | 840 | At least 1 | At least 1 |
| Ex. 5 | 30 | 22 | 34 |
| Ex. 6 | 490 | 2 | 2.5 |

TABLE 2

| | Cell voltage | | Internal resistance |
|---|---|---|---|
| | 0 A/cm$^2$ | 0.2 A/cm$^2$ | (mΩ · cm$^2$) |
| Ex. 1 | 981 | 767 | 96 |
| Ex. 2 | 985 | 765 | 98 |
| Ex. 3 | 988 | 765 | 98 |
| Ex. 4 | 984 | 727 | 119 |
| Ex. 5 | 976 | 770 | 81 |
| Ex. 6 | 954 | 773 | 112 |

INDUSTRIAL APPLICABILITY

According to the present invention, it is possible to provide a mechanically strong polymer electrolyte membrane showing small dimensional change due to a change of the water content. In a production process for producing a membrane-electrode assembly for polymer electrolyte fuel cells, by using this electrolyte membrane, the membrane can easily be positioned, and the membrane does not tend to be wrinkled or broken in the production process. Also, the membrane-electrode assembly obtained is mechanically strong, and the dimensional change due to change of the water content is small. Accordingly, a polymer electrolyte fuel cell having a high reliability, high performance and high durability can be obtained, and the fuel cell can be used also as a hydrogen/oxygen type fuel cell and a direct methanol type fuel cell.

The entire disclosure of Japanese Patent Application No. 2003-112714 filed on Apr. 17, 2003 including specification, claims, drawings and summary is incorporated herein by reference in its entirety.

What is claimed is:

1. A polymer electrolyte membrane comprising at least one layer of a perforated sheet having many through-holes formed substantially in parallel to the thickness direction with an average cross-sectional area per hole of from about 0.03 to 20 mm$^2$, wherein the numerical aperture based on the through-holes is from 30 to 80%, and an ion exchange resin is filled in the through-holes.

2. A polymer electrolyte membrane comprising at least one layer of a perforated sheet comprising a region 1 wherein many through-holes are formed substantially in parallel to the thickness direction with an average cross-sectional area per hole of from about 0.03 to 20 mm$^2$, and the numerical aperture based on the through-holes is from 30 to 80%, and a region 2 which is a peripheral portion of the above region 1 and which has a lower numerical aperture than the above region 1 or has no through-holes, and wherein an ion exchange resin is filled in the through-holes.

3. The polymer electrolyte membrane according to claim 1, wherein on at least one side of the layer having the ion exchange resin filled in the above perforated sheet, a layer made solely of an ion exchange resin which may be the same or different from the above-mentioned ion exchange resin, is formed.

4. The polymer electrolyte membrane according to claim 1, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

5. The polymer electrolyte membrane according to claim 1, wherein the perforated sheet has a thickness of from 3 to 50 µm.

6. The polymer electrolyte membrane according to claim 1, wherein the ion exchange resin filled in the through-holes is made of a perfluorocarbon polymer having sulfonic groups.

7. The polymer electrolyte membrane according to claim 1, wherein the through-holes are filled with the ion exchange resin and a reinforcing filler, wherein the reinforcing filler is a reinforcing filler of a short fiber form having a fiber diameter of from 0.01 to 20 µm, a fiber length of from 1 to 10 mm and an aspect ratio of at least 5.

8. The polymer electrolyte membrane according to claim 3, wherein the through-holes are filled with the ion exchange resin and a reinforcing filler, wherein the reinforcing filler is a reinforcing filler of a short fiber form having an average fiber diameter of from 0.01 to 20 µm, an average fiber length of from 1 to 10 mm and an aspect ratio of at least 5, and the layer made solely of an ion exchange resin contains no reinforcing filler.

9. The polymer electrolyte membrane according to claim 2, wherein on at least one side of the layer having the ion exchange resin filled in the above perforated sheet, a layer made solely of an ion exchange resin which may be the same or different from the above-mentioned ion exchange resin, is formed.

10. The polymer electrolyte membrane according to claim 2, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

11. The polymer electrolyte membrane according to claim 2, wherein the perforated sheet has a thickness of from 3 to 50 µm.

12. The polymer electrolyte membrane according to claim 2, wherein the ion exchange resin filled in the through-holes is made of a perfluorocarbon polymer having sulfonic groups.

13. The polymer electrolyte membrane according to claim 2, wherein the through-holes are filled with the ion exchange resin and a reinforcing filler, wherein the reinforcing filler is a reinforcing filler of a short fiber form having a fiber diameter of from 0.01 to 20 µm, a fiber length of from 1 to 10 mm and an aspect ratio of at least 5.

14. The polymer electrolyte membrane according to claim 9, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

15. The polymer electrolyte membrane according to claim 9, wherein the perforated sheet has a thickness of from 3 to 50 µm.

16. The polymer electrolyte membrane according to claim 9, wherein the ion exchange resin filled in the through-holes is made of a perfluorocarbon polymer having sulfonic groups.

17. A membrane-electrode assembly for polymer electrolyte fuel cells, which comprises a polymer electrolyte membrane and a catalyst layer comprising a catalyst disposed on each side of the polymer electrolyte membrane, wherein the electrolyte membrane comprises at least one layer of a perforated sheet having many through-holes formed substantially in parallel to the thickness direction with an average cross-sectional area per hole of from about 0.03 to 20 mm$^2$, wherein the numerical aperture based on the through-holes is from 30 to 80%, and an ion exchange resin is filled in the through-holes.

18. A membrane-electrode assembly for polymer electrolyte fuel cells, which comprises a polymer electrolyte membrane and a catalyst layer comprising a catalyst disposed on each side of the polymer electrolyte membrane, wherein the electrolyte membrane comprises at least one layer of a perforated sheet comprising a region 1 wherein many through-holes are formed substantially in parallel to the thickness direction with an average cross-sectional area per hole of from about 0.03 to 20 mm$^2$, and the numerical aperture based on the through-holes is from 30 to 80%, and a region 2 which is a peripheral portion of the above region 1 and which has a lower numerical aperture than the above region 1 or has no through-holes, and wherein an ion exchange resin is filled in the through-holes.

19. The membrane-electrode assembly for polymer electrolyte fuel cells according to claim 17, wherein on at least one side of the layer having the ion exchange resin filled in the above perforated sheet, a layer made solely of an ion exchange resin which may be the same or different from the above-mentioned ion exchange resin, is formed.

20. The membrane-electrode assembly for polymer electrolyte fuel cells according to claim 17, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

21. The membrane-electrode assembly for polymer electrolyte fuel cells according to claim 17, wherein the through-holes are filled with the ion exchange resin and a reinforcing filler, wherein the reinforcing filler is a reinforcing filler of a short fiber form having a fiber diameter of from 0.01 to 20 μm, a fiber length of from 1 to 10 mm and an aspect ratio of at least 5.

22. The membrane-electrode assembly for polymer electrolyte fuel cells according to claim 18, wherein on at least one side of the layer having the ion exchange resin filled in the above perforated sheet, a layer made solely of an ion exchange resin which may be the same or different from the above-mentioned ion exchange resin, is formed.

23. The membrane-electrode assembly for polymer electrolyte fuel cells according to claim 18, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

24. The membrane-electrode assembly for polymer electrolyte fuel cells according to claim 18, wherein the through-holes are filled with the ion exchange resin and a reinforcing filler, wherein the reinforcing filler is a reinforcing filler of a short fiber form having a fiber diameter of from 0.01 to 20 μm, a fiber length of from 1 to 10 mm and an aspect ratio of at least 5.

25. A process for producing a polymer electrolyte membrane reinforced by a perforated sheet, comprising applying a coating fluid containing an ion exchange resin to a perforated sheet having many through-holes formed substantially in parallel to the thickness direction with an average cross-sectional area per hole of from 0.03 to 20 mm$^2$, wherein the numerical aperture based on the through-holes is from 30 to 80%, to fill the through-holes with the ion exchange resin.

26. A process for producing a polymer electrolyte membrane reinforced by a perforated sheet, comprising heat pressing a membrane made of an ion exchange resin to a perforated sheet having many through-holes formed substantially in parallel to the thickness direction with an average cross-sectional area per hole of from 0.03 to 20 mm$^2$, wherein the numerical aperture based on the through-holes is from 30 to 80%, to inject and fill the ion exchange resin in the through-holes.

27. A process for producing a polymer electrolyte membrane reinforced by a perforated sheet, comprising applying a coating liquid containing an ion exchange resin to a perforated sheet comprising a region 1 wherein many through-holes are formed substantially in parallel to the thickness direction with an average cross-sectional area per hole of from 0.03 to 20 mm$^2$, and the numerical aperture based on the through-holes is from 30 to 80%, and a region 2 which is a peripheral portion of the region 1 and which has a lower numerical aperture than the region 1 or has no through-holes, to fill the through-holes with the ion exchange resin.

28. A process for producing a polymer electrolyte membrane reinforced by a perforated sheet, comprising heat pressing a membrane made of an ion exchange resin to a perforated sheet comprising a region 1 wherein many through-holes are formed substantially in parallel to the thickness direction with an average cross-sectional area per hole of from 0.03 to 20 mm$^2$, and the numerical aperture based on the through-holes is from 30 to 80%, and a region 2 which is a peripheral portion of the region 1 and which has a lower numerical aperture than the region 1 or has no through-holes, to inject and fill the ion exchange resin in the through-holes.

29. The process for producing a polymer electrolyte membrane according to claim 25, wherein on at least one side of the layer having the ion exchange resin filled in the perforated sheet, a layer made solely of an ion exchange resin which may be the same or different from the above ion exchange resin, is formed.

30. The process for producing a polymer electrolyte membrane according to claim 25, wherein the perforated sheet is made of a polytetrafluoroethylene, a tetrafluoroethylene/hexafluoropropylene copolymer, a tetrafluoroethylene/perfluoroalkoxyethylene copolymer, a polysulfone, a polyphenylene sulfide, a polyarylate, a polyether sulfone, a polyether ether ketone, a polyether imide, a polyether amide, a polypropylene or a polyethylene.

* * * * *

UNITED STATES PATENT AND TRADEMARK OFFICE
CERTIFICATE OF CORRECTION

PATENT NO. : 8,420,701 B2
APPLICATION NO. : 11/249711
DATED : April 16, 2013
INVENTOR(S) : Shinji Kinoshita Page 1 of 1

It is certified that error appears in the above-identified patent and that said Letters Patent is hereby corrected as shown below:

On the title page, Item (73), the Assignee's Item (73) should read:

--(73) Assignee:  Asahi Glass Company, Limited, Tokyo (JP)--

Signed and Sealed this
Eighteenth Day of June, 2013

Teresa Stanek Rea
*Acting Director of the United States Patent and Trademark Office*